M. STEINER.
SYSTEM OF MOTOR CONTROL.
APPLICATION FILED DEC. 10, 1914.
1,174,772.
Patented Mar. 7, 1916.
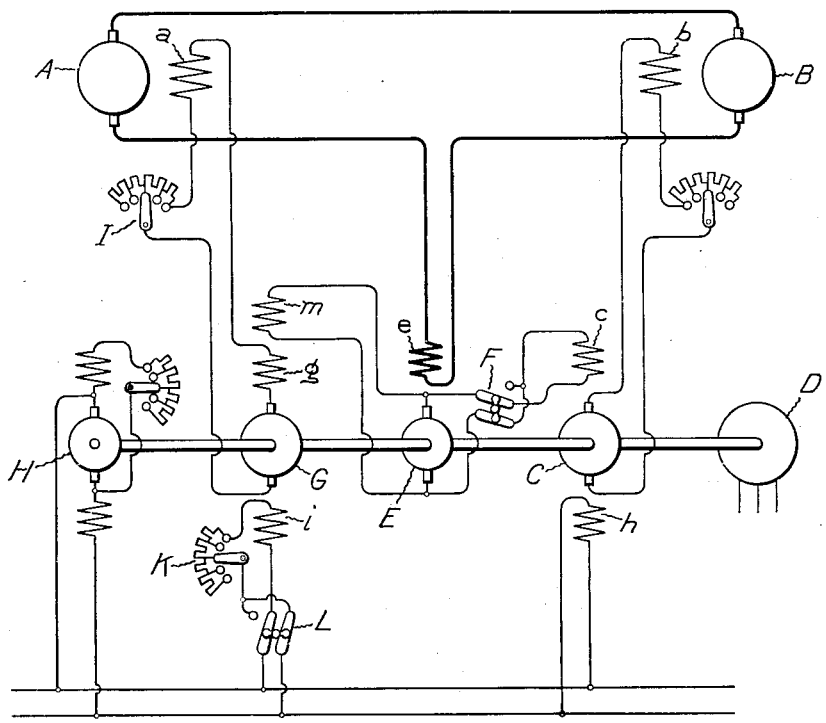
Witnesses:
Anthony Mart.
J Ellis Elen.
Inventor:
Maximilian Steiner,
by Albert G. Davis
His Attorney.

UNITED STATES PATENT OFFICE.

MAXIMILIAN STEINER, OF BERLIN, GERMANY, ASSIGNOR TO GENERAL ELECTRIC COMPANY, A CORPORATION OF NEW YORK.

SYSTEM OF MOTOR CONTROL.

1,174,772. Specification of Letters Patent. Patented Mar. 7, 1916.

Application filed December 10, 1914. Serial No. 876,533.

*To all whom it may concern:*

Be it known that I, MAXIMILIAN STEINER, a subject of the Emperor of Austria-Hungary, residing at Berlin, Germany, have invented certain new and useful Improvements in Systems of Motor Control, of which the following is a specification.

My invention relates to motor control systems, and is particularly applicable to systems of control of the character employed for electrically driven rolling mill motors or the like, which are subject to heavy overloads and must be frequently reversed.

The usual system of control for rolling mill motors or the like comprises a voltage control of a separately excited direct current generator supplying the armature of a separately excited motor. In such systems it has often been found necessary to provide the motor with a cumulatively compounding field winding in order that the motor may have a large starting torque. When a motor having a field winding in series with the line is used, it is necessary to reverse the direction of current through this field winding with respect to the armature upon every reversal of the rolling mill, and when the machine used, is of large size it is necessary to provide a very heavy reversing switch. The patent to Alexander, No. 901,514, shows a system in which the motor is compounded by means of a series exciter having its field winding connected in series with the line through which the current supplying the motor flows. This series exciter supplies current to an auxiliary field winding on the motor.

My invention has for its object a novel arrangement for compounding such a motor in which the motor is provided with only a single field winding.

To this end my invention consists in certain features of novelty which will be pointed out with particularity in the claims annexed to and forming a part of this specification.

For a better understanding of my invention, reference may be had to the following description taken in connection with the accompanying drawing in which the single figure shows diagrammatically a control system in accordance with my invention.

Referring to the drawing, a separately excited generator A supplies current to a motor B having a separately excited field winding $b$. This field winding is supplied with current from an exciter C which is suitably driven, as by the motor D. The exciter C has an auxiliary field winding $c$ which is connected to a series exciter E through a reversing switch F. The exciter E may be driven in any suitable manner and is shown as being driven by the motor D. This exciter E has a field winding $e$ which is connected in series with the supply lines of the motor. The generator A has a field winding $a$ which is preferably supplied with current by a separate exciter G. This exciter G is also shown as being driven by the motor D. I have shown exciters C and G as having main field windings $h$ and $i$ respectively, these windings being supplied with current from the exciter H. Auxiliary winding $c$ is always connected so as to assist the main winding $h$ in strengthening the field of exciter C by means of the reversing switch F, as will be explained hereinafter. In order to vary the field strength of field winding $a$ of generator A, I have provided rheostats I and K. Rheostat I is shown as being in the circuit of field winding $a$, and rheostat K is shown as being in the circuit of field winding $i$ of exciter G. Either of these rheostats may be used for controlling the field strength of generator A to vary the voltage supplied to the armature of motor B.

With the circuit arrangement shown, the armature of generator A supplies current to the armature of motor B and the series exciter E supplies current to the auxiliary field winding of exciter C in proportion to the current flowing in the main circuit, the main field winding $h$ of exciter C being supplied with substantially constant excitation. By cutting out more of the resistance of either rheostat I or K in the well known manner, a greater voltage is supplied to the field winding $a$ of the generator and consequently the generator will operate at a greater voltage and will supply more current to the motor armature. The increase of current supplied to the motor armature will increase the field strength of exciter E, thus increasing its voltage and consequently the current supplied to field winding $c$ of exciter C. This will increase the voltage supplied by exciter C to the field winding $b$ of motor B and thus strengthen its field and increase its torque. When it is desired to reverse the motor the field of generator A is reduced to zero and then reversed and this may be accomplished in any well known manner as by reversing the field winding $i$ of exciter G by means of reversing switch L. At the same time the field winding $c$ of exciter C is reversed by means of the reversing switch F. From this it will be seen that the armature current of the motor is reversed while the motor field winding $b$ is still excited in the same direction from exciter C. As explained above, exciter C is cumulatively compounded so that with an increase of current through the armature of motor B its field winding $b$ is strengthened, thereby causing the motor to develop a greater torque. This is accomplished without the use of a switch in the armature circuit of the motor; in fact, it is accomplished by means of switch F in the armature circuit of the exciter E supplying current to an auxiliary field on exciter C. Consequently it is possible, in accordance with my invention, to provide the main motor B with a single winding which acts as the sum of a shunt winding and an accumulatively compounding winding, no matter in which direction the main motor is operating.

I have also shown the exciter G as being provided with a differential series winding $g$ and an auxiliary winding $m$ excited from the series exciter E and acting in the same direction as the differential series winding $g$. The winding $m$ causes the generator A to act as a differentially compounded generator to reduce its voltage upon an increase in the current supplied to the motor B and thus limit the current output upon the occurrence of a severe overload on the motor. This winding $m$ does not need to be reversed upon a reversal of direction of rotation of motor B, because upon the reversal of the field winding $i$ the current flowing through the series field winding of series exciter E is reversed, thereby reversing the current flowing from its armature, and consequently the current through the winding $m$ is also reversed with the current through the winding $i$.

While I have shown the field winding $e$ of series exciter E as being connected so that the entire current of the armatures of generator A and motor B flow therethrough, it is obvious that it might be so connected to the supply lines of the motor that instead of carrying the entire current it would carry a current proportionately to that in the supply lines, and I aim in the appended claims to cover such a modification as well as any other modifications of my system that do not involve a departure from the spirit and scope of my invention.

What I claim as new and desire to secure by Letters Patent of the United States, is,—

1. In combination, a separately excited generator supplying a motor, means for controlling the field strength of the generator to vary the voltage supplied to said motor, a separately excited field winding on said motor, an exciter connected to said field winding; an auxiliary field winding on said exciter, a series exciter connected to said auxiliary field winding, and a field winding on said series exciter connected in circuit with the supply lines of the motor.

2. In a system of control for reversible motors, a motor having a separately excited field winding, a variable voltage dynamo supplying said motor, an exciter connected to said separately excited field winding, an auxiliary field winding on said exciter, a series exciter having a field winding connected in the main circuit of the motor, said auxiliary field winding being connected to said series exciter, and a reversing switch in the auxiliary field winding circuit of said first mentioned exciter.

3. In combination, a separately excited generator supplying a motor having a separately excited field winding, means for controlling the field strength of the generator to vary the voltage supplied to said motor, an exciter connected to said field winding of said motor and having a main and an auxiliary field winding, a series exciter having a field winding connected in circuit with the supply lines of the motor, said series exciter being connected to said auxiliary field winding, and a reversing switch in the auxiliary field winding circuit of said first mentioned exciter.

4. In combination, a generator, a motor supplied thereby, a separately excited field winding on said generator, an exciter connected to said field winding, means for controlling the field strength of the generator to vary the voltage supplied to said motor, a separately excited field winding on said motor, a second exciter connected to said field winding of said motor, and auxiliary field winding on said second exciter, a series exciter connected to said auxiliary field winding, and a field winding on said series exciter connected in circuit with the supply lines of the motor.

5. In combination, a generator, a motor supplied thereby, a field winding on said generator, an exciter connected to said field winding, main and auxiliary field windings on said exciter, means for controlling the field strength of the generator to vary the voltage supplied to said motor, a separately excited field winding on said motor, a second exciter connected to said field winding of said motor, main and auxiliary field windings on said second exciter, a series exciter connected to said auxiliary field windings of said exciters, and a field winding on said series exciter connected in circuit with the supply lines of the motor.

6. In combination, a generator, a motor supplied thereby, a separately excited field winding on said generator, an exciter connected to said field winding, means for controlling the field strength of the generator to vary the voltage supplied to said motor, a separately excited field winding on said motor, a second exciter connected to said field winding of said motor, an auxiliary field winding on said second exciter, a reversing switch in the circuit of said auxiliary field winding, a series exciter connected to said auxiliary field winding, and a field winding on said series exciter connected in circuit with the supply lines of the motor.

7. In combination, a generator, a motor supplied thereby, a field winding on said generator, an exciter connected to said field winding, main and auxiliary field windings on said exciter, means for controlling the field strength of the generator to vary the voltage supplied to said motor, a separately excited field winding on said motor, a second exciter connected to said field winding of said motor, main and auxiliary field windings on said second exciter, a reversing switch in the circuit of the auxiliary field winding of said second exciter, a series exciter connected to said auxiliary field windings of said exciters, and a field winding on said series exciter connected in circuit with the supply lines of the motor.

In witness whereof, I have hereunto set my hand this twenty-second day of October, 1915.

MAXIMILIAN STEINER.

Witnesses:
AMALIA DERSÓL,
AORSEY UENRIZ.